United States Patent
Haartsen (10) Patent No.: US 8,188,851 B2
(45) Date of Patent: May 29, 2012

(54) WAKE-UP SYSTEM AND METHOD FOR AN ELECTRONIC APPARATUS

(75) Inventor: Jacobus C. Haartsen, Hardenberg (NL)

(73) Assignee: Sony Mobile Communications AB, Lund (SE)

( * ) Notice: Subject to any disclaimer, the term of this patent is extended or adjusted under 35 U.S.C. 154(b) by 477 days.

(21) Appl. No.: 12/434,738

(22) Filed: May 4, 2009

(65) Prior Publication Data

US 2010/0277304 A1  Nov. 4, 2010

(51) Int. Cl.
*G08B 1/00* (2006.01)
(52) U.S. Cl. ............... 340/531; 340/686.1; 340/506; 340/507; 340/511; 340/3.1; 340/539.1
(58) Field of Classification Search ............... 340/686.1, 340/506, 507, 511, 3.1, 539.1
See application file for complete search history.

(56) References Cited

U.S. PATENT DOCUMENTS

| | | | | |
|---|---|---|---|---|
| 2,214,690 | A * | 9/1940 | Cooley ..................... | 379/443 |
| 5,959,529 | A * | 9/1999 | Kail, IV .................... | 340/539.12 |
| 7,053,784 | B2 * | 5/2006 | Hatfield et al. ............ | 340/686.1 |
| 2002/0119802 | A1 | 8/2002 | Hijii | |
| 2003/0162556 | A1 | 8/2003 | Libes | |
| 2004/0056651 | A1 * | 3/2004 | Marietta Bersana ....... | 324/207.2 |
| 2009/0058578 | A1 | 3/2009 | Huang | |

FOREIGN PATENT DOCUMENTS

CN  2560168  7/2003

OTHER PUBLICATIONS

International Preliminary Report on Patentability for corresponding International Application No. PCT/IB09/007325.
International Search Report and Written Opinion from corresponding International Application No. PCT/IB09/007325.

* cited by examiner

*Primary Examiner* — Daryl Pope
(74) *Attorney, Agent, or Firm* — Renner, Otto, Boisselle & Sklar, LLP (57) ABSTRACT

An electronic device may include a wireless transceiver for establishing a wireless interface with a wireless transceiver of another device. The electronic device may further include a wake-up assembly including a permanent magnet that generates a magnet field and a sensor that outputs a signal corresponding to sensed magnetic field. A control assembly of the electronic device may be configured to control at least one of activation or deactivation of the wireless transceiver when the output from the sensor indicates that the magnetic field of the permanent magnet has been disturbed by presence of a magnet external to the electronic device.

12 Claims, 3 Drawing Sheets

WAKE-UP SYSTEM AND METHOD FOR AN ELECTRONIC APPARATUS

TECHNICAL FIELD OF THE INVENTION

The technology of the present disclosure relates generally to activating functionality in an electronic device, such as techniques for waking-up and configuring a wireless communication link between two electronic devices.

BACKGROUND

Wake-up mechanisms are used to start up seldom-used processes in an electronic device. The components used for the process may draw a relatively large amount of power. Therefore, it may be desirable to have the process in an off configuration when not in use. An exemplary process that may be woken-up on an as needed basis is the pairing between two Bluetooth capable devices, such as a mobile telephone and a handsfree headset. During a pairing process, the two units may exchange address and key information that are used to define a trusted environment for future encounters.

Conventionally, pairing over Bluetooth involves a number of actions to be completed by the user. In the case of a phone and headset pairing, the headset needs to be put in a discoverable mode, typically by pushing a button for five or more seconds. Also, the phone needs to be put in an "add a new device" mode using a phone menu.

At least one method has been attempted to simply this procedure without weakening the security aspect of the pairing. In particular, near field communication (NFC) has been used to transfer the address and key information. Alternatively, NFC has been used to wake-up the Bluetooth radios of the headset and phone, and to put the devices into their respective pairing modes.

However, there are drawbacks with this approach. For instance, NFC is based on magnetic coupling and needs a large antenna to operate satisfactory. As a result, NFC antennas are difficult to embed in small, wearable devices, such as headsets. In addition, the NFC operation is not symmetrical in the sense that one device wakes up the other rather than waking-up each other. Also, the NFC interrogator draws a relatively large amount of power and conventionally must be turned on so as not to deplete battery charge. Therefore, there is still an action that the user is required to perform using a button or other input functionality. Alternatively, the NFC interrogator may broadcast periodically. But this involves consumption of power for an infrequently occurring event and, therefore, needlessly places a strain on the battery of a portable device.

SUMMARY

To improve wake-up of a function in an electronic device, the present disclosure describes a wake-up technique that draws no or very little current. The disclosed wake-up technique is well suited for functions such as Bluetooth pairing, but has other applications.

According to one aspect of the disclosure, an electronic device includes a wake-up assembly including a permanent magnet that generates a magnet field and a sensor that outputs a signal corresponding to sensed magnetic field; and a control assembly configured to control at least one of activation or deactivation of a process of the electronic device when the output from the sensor indicates that the magnetic field of the permanent magnet has been disturbed by presence of a magnet external to the electronic device.

According to one embodiment, the electronic device further includes a wireless transceiver for establishing a wireless interface with a wireless transceiver of another device, and wherein the controlled process is at least one of activation or deactivation of the wireless transceiver.

According to one embodiment of the electronic device, the control assembly is further configured to initiate an interfacing protocol to establish the wireless interface upon detection of the disturbance.

According to one embodiment of the electronic device, the wake-up assembly is positioned with respect to a housing of the electronic device so that the position of the wake-up assembly is ascertainable by a user for manual alignment with a wake-up assembly of another device.

According to one embodiment of the electronic device, the disturbance results from movement of the external magnet toward the wake-up assembly.

According to one embodiment of the electronic device, the disturbance results from movement of the external magnet away from the wake-up assembly by movement of another device from a stowed position with respect to the electronic device.

According to one embodiment of the electronic device, the output of the sensor indicates the disturbance if the output meets or exceeds a predetermined threshold.

According to one embodiment of the electronic device, the electronic device is a mobile telephone.

According to one embodiment of the electronic device, the electronic device is a wireless headset.

According to another aspect of the disclosure, an assembly of electronic devices includes a first electronic device having a wake-up assembly having a permanent magnet that generates a magnet field and a sensor that outputs a signal corresponding to sensed magnetic field, and a control assembly; and a second electronic device having a wake-up assembly having a permanent magnet that generates a magnet field and a sensor that outputs a signal corresponding to sensed magnetic field, and a control assembly; wherein each control assembly is configured to control at least one of activation or deactivation of a respective process of the respective electronic device when the output from the respective sensor indicates that the magnetic field of the respective permanent magnet has been disturbed by the wake-up assembly of the other one of the electronic devices.

According to one embodiment of the assembly, the first electronic device further includes a wireless transceiver for establishing a wireless interface, the second electronic device further includes a wireless transceiver for establishing a wireless interface, and the controlled processes are at least one of activation or deactivation of the respective wireless transceivers.

According to one embodiment of the assembly, each control assembly is further configured to initiate an interfacing protocol to establish a wireless interface between the wireless transceivers upon detection of the disturbance.

According to one embodiment of the assembly, the first electronic device is a mobile telephone and the second electronic device is a headset with at least one speaker for outputting audio corresponding to an audio signal transmitted by the wireless transceiver of the first electronic device and a microphone for detecting speech of a user, and the wireless transceiver of the second electronic device transmitting a speech signal corresponding to the detected speech to the first electronic device.

According to one embodiment of the assembly, each wake-up assembly is positioned with respect to a respective electronic device housing so that the positions of the wake-up assemblies are ascertainable by a user for manual alignment with each other.

According to one embodiment of the assembly, the output of one of the sensors indicates the disturbance if the output meets or exceeds a predetermined threshold.

According to one embodiment of the assembly, the wake-up assemblies are arranged in mirror image fashion to each other when aligned with one another to cause the respective disturbances.

According to another aspect of the disclosure, a method of controlling an electronic device includes sensing changes in a magnetic field of a permanent magnet of the electronic device; detecting that the magnetic field has been reduced to meet or exceed a predetermined threshold; and in response to the detection, at least one of activating or deactivating a process of the electronic device.

According to one embodiment of the method, the process of the electronic device includes activating a wireless transceiver of the electronic device and initiating an interfacing protocol to establish a wireless interface with a wireless transceiver of another electronic device.

According to one embodiment of the method, the reduction in the magnetic field is caused by user positioning of another electronic device with respect to the electronic device so as to bring a wake-up assembly of the another electronic device within a predetermined distance of a wake-up assembly of the electronic device.

According to one embodiment of the method, the electronic device is a mobile telephone and the another device is a headset.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Embodiments will now be described with reference to the drawings, wherein like reference numerals are used to refer to like elements throughout. It will be understood that the figures are not necessarily to scale.

In the present document, embodiments are described primarily in the context of a portable radio communications device, such as the illustrated mobile telephone. It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a media player, a gaming device, a computer, a pager, a communicator, an electronic organizer, a personal digital assistant (PDA), a smartphone, a portable communication apparatus, etc.

Figure 1:
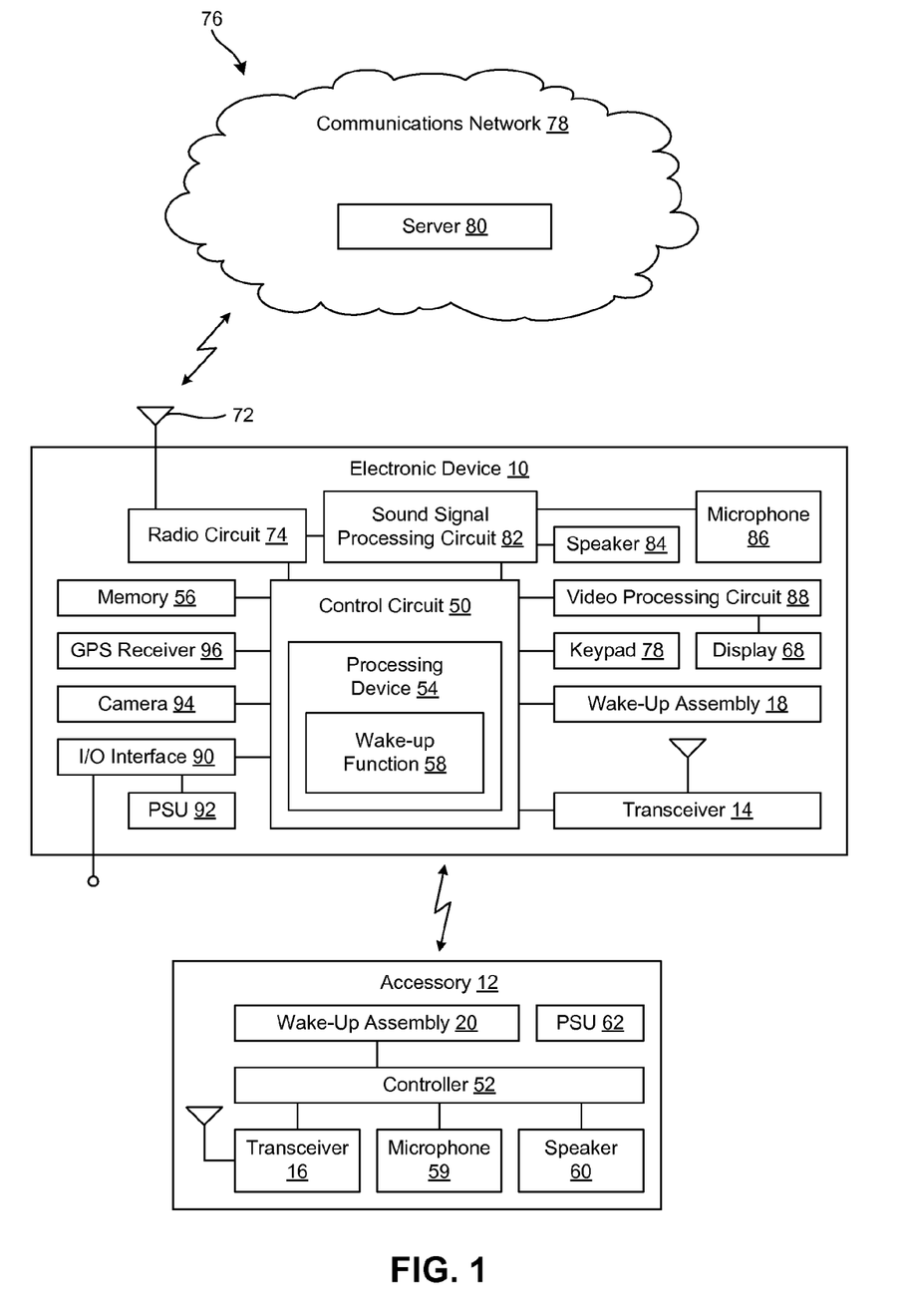
FIG. 1 is a schematic block diagram of a mobile telephone and a wireless headset, where the mobile telephone is configured to operate as part of a communications system.

Referring initially to FIG. 1, an electronic device 10 in the form of a mobile phone and a coordinating accessory 12 in the form of a wireless personal handsfree (PHF) headset are shown. In one embodiment, the electronic device 10 includes a wireless transceiver 14 that may establish a wireless interface with a compatible wireless transceiver 16 of the accessory 12 so that data signals may be exchanged between the electronic device 10 and the accessory 12. The transceivers 14 and 16 may operate in accordance with Bluetooth, for example.

In order for the electronic device 10 and the accessory 12 to communicate using the transceivers 14 and 16, an initial pairing between the electronic device 10 and the accessory 12 may be made. To perform this function, pairing functionality of the electronic 10 and pairing functionality of the accessory 12 each may be activated, or "woken-up." Even after initial pairing of the device 10 and the accessory 12 has been made, the transceivers 14 and 16 may be maintained in unpowered ("off") or reduced power ("standby") states. Therefore, to use the accessory 12 with the electronic device 10, the transceivers 14 and 16 may need to be activated, or placed in powered ("on") states, for encounters occurring after the initial pairing.

To wake-up the pairing functionality and/or place the transceivers 14 and 16 in their powered states, a wake-up assembly 18 of the electronic device 10 may be brought into close proximity with a corresponding wake-up assembly 20 of the accessory 12. When the wake-up assemblies 18 and 20 are positioned with respect to each other so as to achieve a predetermined output response of respective sensor components of the assemblies 18 and 20, control components of the devices 10 and 12 may turn on the transceivers 14 and 16, and initiate the pairing of the devices 10 and 12, if applicable.

Figure 2:
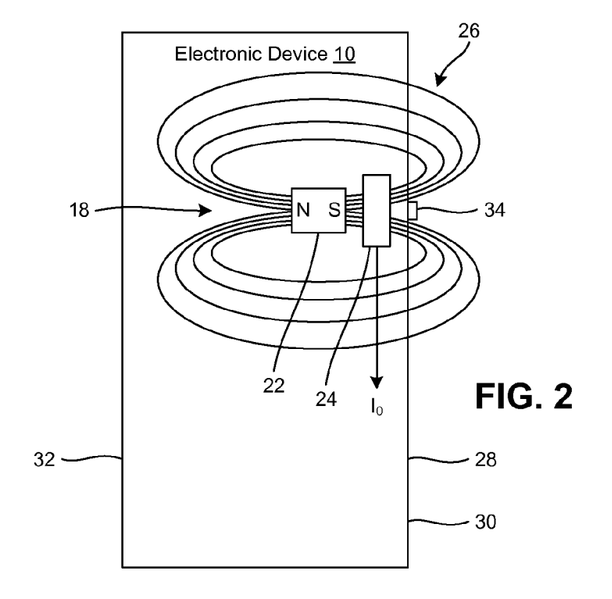
FIG. 2 is a schematic diagram of a wake-up assembly of the mobile telephone.

With additional reference to FIG. 2, the wake-up assembly 18 of the electronic device 20 is illustrated in greater detail. The wake-up assembly 20 of the accessory 12 may be arranged in the same or similar manner.

The wake-up assembly 18 may include a permanent magnet 22 and a magnetic sensor 24 (also referred to as a magneto-sensor). The permanent magnet 22 produces a constant magnetic field, as graphically illustrated by flux lines 26. In the illustrated embodiment of a bar magnet, the sensor 24 is placed in front of one of the poles of the magnet 22. In the illustrated embodiment, the pole in front of which the sensor 24 is placed is the south pole of the magnet 22. In other embodiments, the orientation of the magnet 22 may be reversed so that the sensor 24 is placed in front of the north pole of the magnet 22. Also, in the illustrated embodiment, the wake-up assembly 18 is arranged so that sensor 24 is positioned between a front surface 28 of a housing 30 of the electronic device 10 and the selected pole of the magnet 22. The opposite pole of the magnet 22 points toward the opposite surface of the housing 30, which in the illustrated case is a rear surface 32. It will be appreciated that the wake-up sensor may be arranged differently with respect to the housing 30 so that the sensor 24 may be located adjacent a different surface (e.g., an end, a side, or the rear surface 32).

Other magnet arrangements are possible. For example, the permanent magnet 22 may be an annular-shaped ring magnet. In this case, the sensor 24 may be placed close to or inside the central hole of the magnet.

In one embodiment, the wake-up assembly 18 may be positioned with respect to the housing 30 in a position that is readily ascertainable by a user. For instance, a marking 34 on the housing 30 may indicate the position of the wake-up assembly 18. In one embodiment, the wake-up assembly 18 may be positioned under a company logo of the manufacturer of the electronic device 10.

The sensor 24 may be a Hall Effect sensor or a magneto-resistance effect sensor. Alternatively, the sensor 24 may be based on inductive principles and may be constructed using microcoils. In either case, the sensor 24 may output a signal (e.g., analog current value) that has a relationship to the sensed magnetic field or has a relationship to changes in the magnetic field.

Based on the proximal relationship of the sensor 24 to the magnet 22, the sensor is subject to the constant magnetic field of the magnet 22. The magnitude of the constant magnetic field at the sensor 24 is dependent on the position of the sensor 24 with respect to the permanent magnet 22. Absent external influence on the magnetic field of the magnet 22, the output signal of the sensor 24 will be substantially constant. It is noted that a relatively small bias current may be applied to the sensor 24 to provide for operation of the sensor 24. However, the current load of the sensor 24 is considered to be negligible with respect to the overall power consumption of the electronic device 10, particularly when the transceiver 14 is activated. Alternatively, the bias current that is applied to the sensor 24 may be applied periodically with a relatively low duty cycle. For example, every 100 milliseconds (ms), the sensor 24 may be provided with the bias current for 10 ms. For each cycle, the output of the sensor 24 may be compared with the previously measured output to determine if the magnetic field has been influenced as described in greater detail below. If the sensor is based on induction, a bias current need not be applied to sensor 24. In this case, disturbance of the magnetic field by the movement of an external magnet may induce a voltage in a sensor that results in a current output or other suitable signal.

FIG. 2 represents the steady state situation of the wake-up assembly 18 when no moving magnets or ferromagnetic material is close enough to substantially influence the magnetic field sensed by the sensor 24. Therefore, FIG. 2 shows an undisturbed magnetic field produced by the magnet 22 so that a relatively constant magnetic flux flows through the sensor 24.

Figure 3:
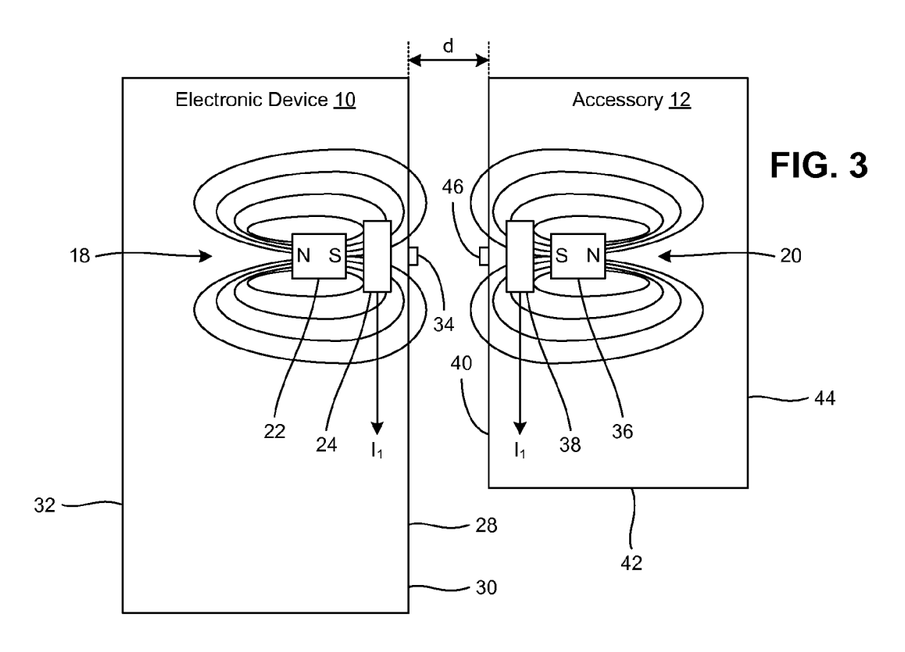
FIG. 3 is a schematic diagram of an interaction between the wake-up assembly of the mobile telephone and a wake-up assembly of the wireless headset.

With additional reference to FIG. 3, the wake-up assembly 20 of the accessory 12 may be arranged in similar manner to the wake-up assembly 18 of the electronic device 10. The wake-up assembly 20 may include a permanent magnet 36 and a magnetic sensor 38. The permanent magnet 36 produces a constant magnetic field. For simplicity of the description, the wake-up assembly 20 is configured in the same manner as the illustrated wake-up assembly 18. However, it will be appreciated that any of the above-described alternative arrangements for the wake-up assembly 18 may be applied to the wake-up assembly 20. In the illustrated embodiment, the sensor 38 is placed in front of one of the poles of the magnet 36. In one embodiment, the sensor 38 is placed in front of the same pole type in front of which the sensor 24 is placed. In the illustrated example, this is the south pole, but may be the north pole in other embodiments.

The wake-up assembly 20 is arranged so that sensor 38 is positioned between a selected surface 40 of a housing 42 of the accessory 12 and the selected pole of the magnet 36. In the illustrated example, the surface 40 may be considered a front surface of the accessory 10, but it will be appreciated that the selected surface 40 may be some other surface of the accessory 12. The opposite pole of the magnet 36 points toward an opposite surface 44 of the housing 42, which is a rear surface in the illustration of FIG. 3.

In one embodiment, the wake-up assembly 20 may be positioned with respect to the housing 42 in a position that is readily ascertainable by a user. For instance, a marking 46 on the housing 40 may indicate the position of the wake-up assembly 20. In one embodiment, the wake-up assembly 20 may be positioned under a company logo of the manufacturer of the accessory 12.

The sensor 38 may be a Hall Effect sensor or a magneto-resistance effect sensor. Alternatively, the sensor 38 may be based on inductive principles and may be constructed using microcoils. In either case, the sensor 38 may output a signal (e.g., analog current value) that has a relationship to the sensed magnetic field or has a relationship to changes in the magnetic field.

Based on the proximal relationship of the sensor 38 to the magnet 36, the sensor is subject to the constant magnetic field of the magnet 36. As a result, absent external influence on the magnetic field of the magnet 36, the output signal of the sensor 38 will be substantially constant. It is noted that a relatively small bias current may be constantly or periodically applied to the sensor 38 to provide for operation of the sensor 38. However, the current load of the sensor 38 is considered to be negligible with respect to the overall power consumption of the accessory 12 when the transceiver 16 is activated. As indicated, in the case of an induction-based sensor, a bias current need not be applied to the sensor 38.

The wake-up assembly 18 of the electronic device 10 and the wake-up assembly 20 of the accessory 12 may be arranged as mirror images to each other when the selected surfaces 28 and 40 face each other. In this manner, when the accessory 12 and the electronic device 10 are positioned relative to one another to align the assemblies 18 and 20, common poles of the magnets 22 and 36 face each other. In this configuration (e.g., when the electronic device 10 and the accessory 12 are placed in close range of each other with the markings 34 and 46 for the assemblies 18 and 20 generally aligned with each other), the magnetic flux of the magnets 22 and 36 will act upon each other to cause changes in the outputs of the sensors 24 and 38. These output changes may be detected and used to serve as triggers to respectively control (e.g., turn on or turn off) components of the electronic device 10 and the accessory 12, such as the "power hungry" transceivers 14 and 16. The markings 34 and 46 may be any appropriate indicator, such as a ridge or depression in the material of the housings 30 and 42, text that has been printed or otherwise applied to the housings 30 and 42, a company logo, or other feature. The marking 34 on the electronic device 10 need not be the same as the marking 46 on the accessory 12. In other embodiments, one or both of the electronic device 10 and the accessory 12 may not have a marking to indicate the position of the wake-up assembly 20.

In use, a user may bring the electronic device 10 and the accessory 12 close to each other while using the markings 34 and 46 to align the wake-up assemblies 18 and 20 to activate or deactivate a process of the electronic device 10 and/or activate or deactivate a process of the accessory 12. In one embodiment, bringing the electronic device 10 and the accessory 12 close to each other may include touching of the devices together, such as by tapping of the respective housings to each other. Continuing the example of a mobile telephone and a wireless headset, the controlled processes may be activating the transceivers 14 and 16. Then, if appropriate, pairing (or other interfacing protocol) of the electronic device 10 and the accessory 12 may be automatically carried out without additional user interaction with an input function, such as a making menu selection, a pressing button, etc. Upon completion of the interfacing protocol, the electronic device 10 will be ready to use with the accessory 12. In the case where the accessory 12 is a headset, the user may position the headset (e.g., attach the headset to an ear or both ears) and use the headset in conjunction with the electronic device 10 to listen to music, engage in voice communications (e.g., telephone calls), issue voice commands to the electronic device 10, and so forth. Another exemplary process may be the starting of a counter in each of the two devices. The counters may be subsequently used for transmitting and decrypting encrypted messages between the devices, for example.

When the user is finished using the accessory 12, the transceivers 14 and 16 may be deactivated. Deactivation may occur automatically if the accessory 12 and/or the electronic device 10 are not used for a predetermined amount of time. Alternatively, the user may cause deactivation by undertaking an action, such as pressing an appropriate button on one of the electronic device 10 or the accessory 12, selecting an appropriate menu option, or other action. Another action may be, for example, bringing electronic device 10 and the accessory 12 into proximity with one in the manner used to activate the transceivers 14 and 16. While the transceivers 14 and 16 are activated, this action may be detected and used as a trigger to deactivate the transceivers 14 and 16 (or deactivate other component(s) that were activated by the prior proximal relationship of the assemblies 18 and 20).

Alternatively, the aligned positioning of the assemblies 18 and 20 may be used to deactivate components of the electronic device 10 and/or the accessory 12. For instance, some mobile telephones have a receptacle for stowing a headset when the headset is not in use. The wake-up assemblies 18 and 20 may be positioned in their respective housings 30 and 40 so as to be aligned when the headset is stowed. The mutual effect of the magnets 22 and 36 may then be detected and used as a trigger to turn off the transceivers 14 and 16. When the user removes the headset from the stowed position, the absence of the mutual magnetic effect may be detected and used as a trigger to activate the transceivers 14 and 16 and complete any appropriate interfacing protocol.

As indicated, when one wake-up assembly 18 or 20 is placed in relatively close proximity with the other wake-up assembly 18 or 20 (e.g., within a threshold distance to result in a threshold current change in the output of the corresponding sensor 24 or 38), the corresponding magnetic fields of the magnets 36 and 22 will be disturbed. This disruption is graphically represented in FIG. 3. It is contemplated that the magnetic fields at the positions of the sensors 24 and 38 will be reduced by the presence of two magnetic fields of opposing polarity. As the distance between the wake-up assemblies becomes smaller, the magnetic field at the positions of the sensors 24 and 38 also will become smaller and may begin to approach zero.

This magnetic field change may be detected as a change in the output signals from the sensors 24 and 38. In one embodiment, a current value of the output signals is inversely related to the strength of the magnetic field. It is contemplated that the change in output signal will be similar for both wake-up assemblies 18 and 20.

Figure 4:
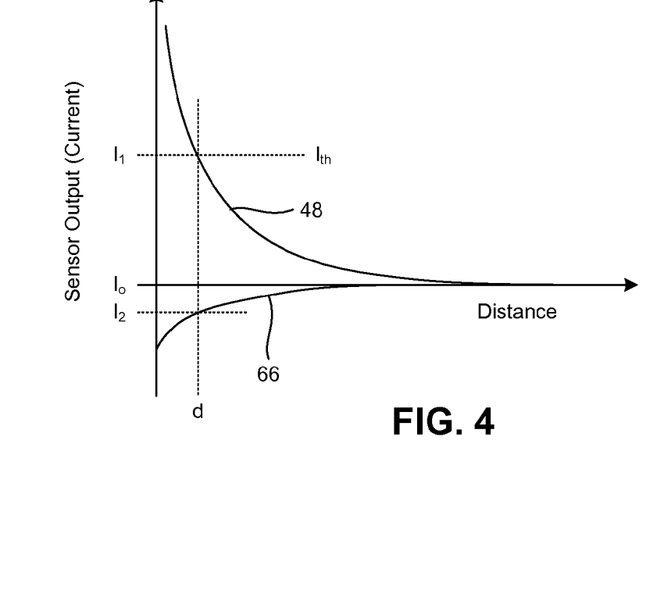
FIG. 4 is a graph of wake-up assembly output versus distance for when the wake-up assembly is in the presence of another wake-up assembly and for when the wake-up assembly is in the presence of a piece of metal.

With additional reference to FIG. 4, illustrated is graph of current output from either of the sensors 24 or 38 versus distance to another object. Curve 48 shows the output when the two wake-up assemblies 18 and 20 are brought close together. In the graph, $I_o$ indicates the steady state current output, such as when no object that disturbs the magnetic field of the magnet 22 or 36 is moved in the presence of the wake-up assembly 18 or 20. For example, FIG. 2 represents conditions when $I_o$ may be the output signal from the sensor 24 or 38.

As the wake-up sensors 18 and 20 undergo movement toward each other, the current output of the sensors 24 and 38 may increase. At a certain distance d between the housing 30 of the electronic device and the housing 42 of the accessory 12, the current output may equal or exceed a predetermined threshold current $I_{th}$. This condition is represented by FIG. 3 and has a corresponding current value labeled $I_1$. The distance d and the threshold current $I_{th}$ may be determined as a function of desired sensitivity. Factors that contribute to the current output for various distances between the wake-up assemblies 18 and 20 include strength of the magnets 22 and 36, the sensitivity of the sensors 24 and 38, and the fixed distance between the sensor 24 and the magnet 22 (or fixed distance between the sensor 38 and the magnet 36). In one embodiment, the distance d that corresponds to the predetermined threshold $I_{th}$ is about zero inches (or about zero centimeters) to about one inch (or about 2.5 centimeters).

For the output signal of the sensors 24 and 38 to cross the threshold, the wake-up assemblies 18 and 20 may be placed in close proximity to one another with alignment of one assembly 18 or 20 in front of the other assembly 18 or 20. It will be understood that the alignment need not be perfect to result in an output that crosses the threshold. As indicated, markers on the electronic device 10 and the accessory 12 (e.g., a corporate logo) may assist the user in making adequate alignment between the two devices.

In one embodiment, the wake-up assemblies 18 and 20 each may include a low-pass filter to filter out effects from TV coils and other devices (e.g., devices that use customary 50 or 60 Hz AC power).

With continuing reference to FIGS. 1-4, the output signal from the sensor 24 of the electronic device 10 may be input to a control circuit 50 of the electronic device 10. Similarly, the output signal from the sensor 38 of the accessory 12 may input to a controller 52 of the accessory 12. The output signals may be respectively input to the control circuit 50 and controller 52 as raw input signals (e.g., current signals), or the outputs may be converted into a representation of the output current. For instance, the raw signals may be processed by respective interface circuits (not shown) that convert the signals to corresponding digital values or corresponding voltages.

In one embodiment, the interface circuits perform monitoring and analysis of the signals, and detect if the output exceeds the predetermined threshold. In this embodiment, if the interface circuit detects that the output exceeds the predetermined threshold, an appropriate output may be made to the control circuit 50 or the controller 52. The output may be in the form of a data value (e.g., a binary word or message), or the output may be a change of a control value from a logical low to a logical high, or vice versa. Such an interface circuit may be implemented with a general purpose input/output (GPIO).

The control circuit 50 may be configured to act upon the output from the wake-up assembly 18. In one exemplary embodiment, the control circuit 50 may be a primary control circuit 50 for the electronic device 10 and may include a processing device 54, such as a central processing unit (CPU), microcontroller or microprocessor. The control circuit 50 may be configured to carry out overall control of the functions and operations of the electronic device 10. The processing device 54 executes code stored in a memory (not shown) within the control circuit 54 and/or in a separate memory, such as a memory 56, in order to carry out operation of the electronic device 10.

For instance, the memory within the control circuit 50 and/or the memory 56 may store executable code that embodies a wake-up function 58 and the processing device 54 may execute that code so that the control circuit 50 is configured to implement the functions of the wake-up function 58. The memory 56 may be, for example, one or more of a buffer, a flash memory, a hard drive, a removable media, a volatile memory, a non-volatile memory, a random access memory (RAM), or other suitable device. In a typical arrangement, the memory 56 may include a non-volatile memory for long term data storage and a volatile memory that functions as system memory for the control circuit 50. The memory 56 may exchange data with the control circuit 50 over a data bus. Accompanying control lines and an address bus between the memory 56 and the control circuit 50 also may be present.

The wake-up function 58 may be configured to detect that the wake-up assembly 18 has been placed in proximity to the wake-up assembly 20 so as to cause the output of the sensor 24 to exceed the predetermined threshold. In response, the wake-up function 58 may call other functionality and cause components of the electronic device 10 to be activated. For instance, the transceiver 14 may be powered on and functionality to pair the transceiver 14 and/or initiate communication with a compatible transceiver (e.g., transceiver 16) may be initiated. The wake-up function 58 may be embodied as executable instructions (e.g., code) that is resident in and executed by the electronic device 10. In one embodiment, a computer readable medium may store the wake-up function 58 in the form of one or more programs. The wake-up function 58 may be a stand-alone software application or form a part of a software application that carries out additional tasks related to the electronic device 10. Also, while the wake-up function 58 is implemented in software in accordance with an embodiment, such functionality could also be carried out via dedicated hardware or firmware, or some combination of hardware, firmware and/or software.

Similar to the control circuit 50, the controller 52 may be configured to act upon the output from the wake-up assembly 20. The controller 52 may be configured to carry out overall control of the functions and operations of the accessory 12, and may be implemented with a processor, a microcontroller, a microprocessor, or other appropriate assembly. Also, the controller 52 may include a memory. In a typical embodiment, the controller 52 is a firmware-based assembly. In the case where the accessory 12 is a headset for a mobile telephone, the controller 52 may further include sound processing components, such as buffers, audio decoders, audio encoders, amplifiers and so forth.

The controller 52 may be configured to detect that the wake-up assembly 20 has been placed in proximity to the wake-up assembly 18 so as to cause the output of the sensor 38 to exceed the predetermined threshold. In response, the controller 52 may invoke other functionality and cause components of the accessory 12 to be activated. For instance, the transceiver 16 may be powered on and functionality to pair the transceiver 16 and/or initiate communication with a compatible transceiver (e.g., transceiver 14) may be initiated. In the embodiment where the accessory 12 is a headset, the controller 52 also may activate a microphone 59 and one or more speakers 60 so that audio transmitted from the electronic device 10 may be heard and so that speech from the user may be detected and transmitted to the electronic device 10. Operating power for the accessory 12 may be supplied by a battery-based power supply unit (PSU) 62.

Returning to the detection function of the wake-up assemblies 18 and 20, the wake-up assemblies 18 and 20 need only detect certain types of changes in the magnetic field. Therefore, metal or ferromagnetic material in or near the electronic device 10 or the accessory should not affect or be mistaken for detection of the movement of the wake-up assemblies 18 and 20 toward (or away) from each other. Therefore, the wake-up function of the electronic device 10 and the accessory 12 need not be triggered when the corresponding wake-up assembly 18 or 20 is close to a metal object since a metal object should not reduce the magnetic field at the sensor 24 or 38 to near zero as occurs with a magnet with opposite polarity to the magnet 22 or 36.

Figure 5:
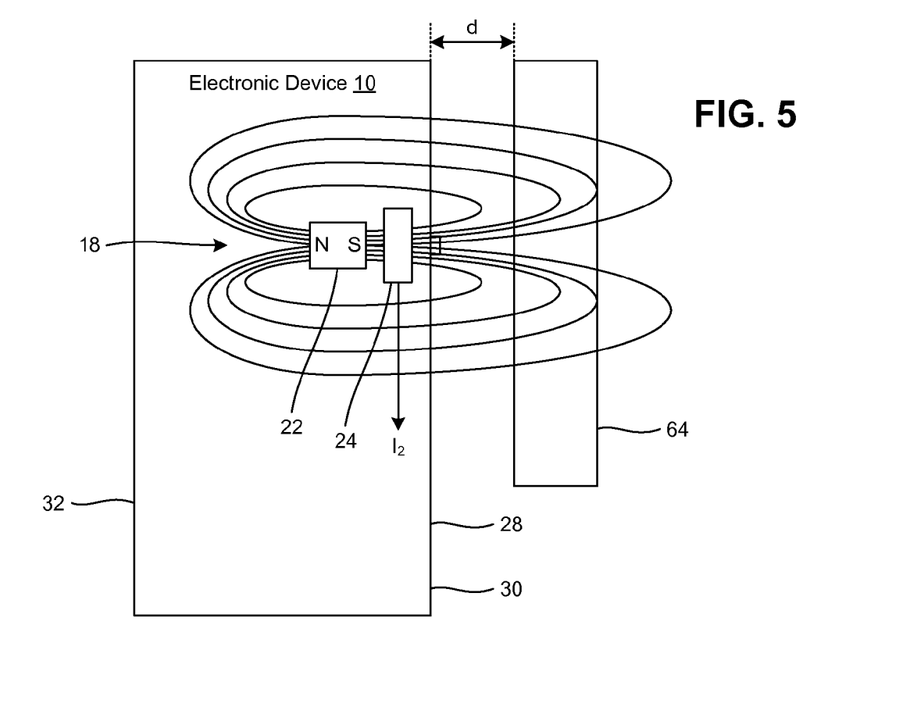
FIG. 5 is a schematic diagram of an interaction between the wake-up assembly of the mobile telephone and the piece of metal.

With additional reference to FIG. 5, it is possible that the magnetic field may be increased by the ferromagnetic effect from a metal object 64 that is placed in close proximity to the wake-up assembly 18 or 20. This increase of magnetic field is represented by curve 66 in the graph of FIG. 4, where $I_2$ is the output from the sensor 24 or 38 when the metal object 64 is placed at distance d.

As indicated, a change in output signal from the sensors 24 and/or 38 (e.g., change in output current, voltage or other value) that crosses the predetermined threshold amount (e.g., $I_{th}$) may be used as a trigger to control a process in the appropriate device 10 and/or 12. For example, that change may be used as a trigger to start up a wireless interface in the electronic device 10 and/or the accessory 12. In the exemplary embodiment of a phone and headset pairing, the wireless interface may be based on Bluetooth radios, for example. However, the disclosed techniques are not limited to Bluetooth, or to phone and headset pairing. For example, start-up scenarios as envisioned using NFC may be instead supported by the disclosed techniques. In this manner, wireless local area network (WLAN) radios and ultra-wideband (UWB) radios may be activated using the disclosed techniques. Also, wake-up assemblies may be used between two phones, between a computer and a phone, between a computer and an accessory, or any other combination of devices that include wake-up assemblies. In still other situations, a wake-up assembly device may be activated by a magnet in another device, even if that other device does not include a full wake-up assembly.

As will be appreciated, the use of a permanent magnet results in a passive wake-up field that draws no current, although the sensor may draw a small amount of power. Positioning of one wake-up assembly with respect to another wake-up assembly allows for symmetric wake-up mechanism that can coexist with ferromagnetic devices.

Various other features of the electronic device 10 when configured as a mobile telephone will now be described. The electronic device 10 may include a display 68. The display 68 displays information to a user such as operating state, time, telephone numbers, contact information, various menus, etc., that enable the user to utilize the various features of the electronic device 10. The display 68 also may be used to visually display content received by the electronic device 10 and/or retrieved from the memory 56. For example, the display 68 may be used to present images, video, Internet pages, game content, and other graphics to the user.

A keypad 78 and/or other input functionality may provide for a variety of user input operations. For example, the keypad 78 may include alphanumeric keys for allowing entry of alphanumeric information (e.g., telephone numbers, phone lists, contact information, notes, text, etc.), special function keys (e.g., a call send and answer key, multimedia playback control keys, a camera shutter button, etc.), navigation and select keys or a pointing device, and so forth. Keys or key-like functionality also may be embodied as a touch screen associated with the display 68. Also, the display 68 and keypad 78 may be used in conjunction with one another to implement soft key functionality.

The electronic device 10 includes communications circuitry that enables the electronic device 10 to establish communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in the memory 56, executing applications to allow user interaction with the data, displaying video and/or image content associated with the data, outputting audio sounds associated with the data, and so forth.

In the exemplary embodiment, the communications circuitry may include an antenna 72 coupled to a radio circuit 74. The radio circuit 74 includes a radio frequency transmitter and receiver for transmitting and receiving signals via the antenna 72. The radio circuit 74 may be configured to operate in a mobile communications system 76. Exemplary radio circuit 74 types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, integrated services digital broadcasting (ISDB), high speed packet access (HSPA), etc., as well as advanced versions of these standards or any other appropriate standard. It will be appreciated that the electronic device 10 may be capable of communicating using more than one standard. Therefore, the antenna 72 and the radio circuit 74 may represent one or more than one radio transceiver.

The system 76 may include a communications network 78 having a server 80 (or servers) for managing calls placed by and destined to the electronic device 10, transmitting data to and receiving data from the electronic device 10 and carrying out any other support functions. The server 80 communicates with the electronic device 10 via a transmission medium. The transmission medium may be any appropriate device or assembly, including, for example, a communications base station (e.g., a cellular service tower, or "cell" tower), a wireless access point, a satellite, etc. The network 78 may support the communications activity of multiple electronic devices 10 and other types of end user devices. As will be appreciated, the server 80 may be configured as a typical computer system used to carry out server functions and may include a processor configured to execute software containing logical instructions that embody the functions of the server 80 and a memory to store such software.

The electronic device 10 further includes a sound signal processing circuit 82 for processing audio signals transmitted by and received from the radio circuit 74. Coupled to the sound processing circuit 82 are a speaker 84 and a microphone 86 that enable a user to listen and speak via the electronic device 10. The radio circuit 74 and sound processing circuit 82 are each coupled to the control circuit 50 so as to carry out overall operation. Audio data may be passed from the control circuit 50 to the sound signal processing circuit 82 for playback to the user. The audio data may include, for example, audio data from an audio file stored by the memory 56 and retrieved by the control circuit 50, or received audio data such as in the form of voice communications or streaming audio data from a mobile radio service. The sound processing circuit 82 may include any appropriate buffers, audio decoders, audio encoders, amplifiers and so forth.

The display 68 may be coupled to the control circuit 50 by a video processing circuit 88 that converts video data to a video signal used to drive the display 68. The video processing circuit 88 may include any appropriate buffers, decoders, video data processors and so forth. The video data may be generated by the control circuit 50, retrieved from a video file that is stored in the memory 56, derived from an incoming video data stream that is received by the radio circuit 74 or obtained by any other suitable method.

The electronic device 10 may further include one or more input/output (I/O) interface(s) 90. The I/O interface(s) 90 may be in the form of typical mobile telephone I/O interfaces and may include one or more electrical connectors. The I/O interfaces 90 may form one or more data ports for connecting the electronic device 10 to another device (e.g., a computer) or an accessory (e.g., a personal handsfree (PHF) device) via a cable. Further, operating power may be received over the I/O interface(s) 90 and power to charge a battery of a power supply unit (PSU) 92 within the electronic device 10 may be received over the I/O interface(s) 90. The PSU 92 may supply power to operate the electronic device 10 in the absence of an external power source.

A camera 94 may be present for taking digital pictures and/or movies. Image and/or video files corresponding to the pictures and/or movies may be stored in the memory 56.

A position data receiver, such as a global positioning system (GPS) receiver 96, may be involved in determining the location of the electronic device 10.

Although certain embodiments have been shown and described, it is understood that equivalents and modifications falling within the scope of the appended claims will occur to others who are skilled in the art upon the reading and understanding of this specification.

What is claimed is:

1. An electronic device, comprising:
   a wake-up assembly including a permanent magnet that generates a magnet field and a sensor that outputs a signal corresponding to sensed magnetic field;
   a wireless transceiver for establishing a wireless interface with a wireless transceiver of an accessory for the electronic device; and
   a control assembly configured to control activation of a process of the electronic device when the output from the sensor indicates that the magnetic field of the permanent magnet has been disturbed in a predetermined manner by presence and movement of a permanent magnet external to the electronic device, the activation of the process including powering on the transceiver to communicate with the accessory; and wherein the electronic device is a mobile telephone and the accessory is a wireless headset.

2. The electronic device of claim 1, wherein the control assembly is further configured to initiate an interfacing protocol to establish the wireless interface upon detection of the disturbance.

3. The electronic device of claim 1, wherein the wake-up assembly is positioned with respect to a housing of the electronic device so that the position of the wake-up assembly is ascertainable by a user for manual alignment with a wake-up assembly of the accessory.

4. The electronic device of claim 1, wherein the disturbance results from movement of the external magnet toward the wake-up assembly.

5. The electronic device of claim 1, wherein the disturbance results from movement of the external magnet away from the wake-up assembly by movement of another device from a stowed position with respect to the electronic device.

6. The electronic device of claim 1, wherein the output of the sensor indicates the disturbance if the output meets or exceeds a predetermined threshold.

7. An assembly of a first and a second electronic device, comprising:
  a mobile telephone being the first electronic device that includes:
    a wake-up assembly having a permanent magnet that generates a magnet field and a sensor that outputs a signal corresponding to sensed magnetic field;
    a wireless transceiver for establishing a wireless interface with a wireless transceiver of the second electronic device; and
    a control assembly; and
  a wireless headset being the second electronic device that includes:
    a wake-up assembly having a permanent magnet that generates a magnet field and a sensor that outputs a signal corresponding to sensed magnetic field;
    a wireless transceiver for establishing a wireless interface with the wireless transceiver of the first electronic device; and
    a control assembly;
  wherein each control assembly is configured to control activation of the transceiver of the respective electronic device when the output from the respective sensor indicates that the magnetic field of the respective permanent magnet has been disturbed in a predetermined manner by presence and movement of the permanent magnet of the wake-up assembly of the other one of the electronic devices.

8. The assembly of claim 7, wherein each control assembly is further configured to initiate an interfacing protocol to establish a wireless interface between the wireless transceivers upon detection of the disturbance.

9. The assembly of claim 7, wherein the second electronic device further comprises a speaker for outputting audio corresponding to an audio signal transmitted by the wireless transceiver of the first electronic device and a microphone for detecting speech of a user, and the wireless transceiver of the second electronic device transmitting a speech signal corresponding to the detected speech to the first electronic device.

10. The assembly of claim 7, wherein each wake-up assembly is positioned with respect to a respective electronic device housing so that the positions of the wake-up assemblies are ascertainable by a user for manual alignment with each other.

11. The assembly of claim 7, wherein the output of one of the sensors indicates the disturbance if the output meets or exceeds a predetermined threshold.

12. The assembly of claim 7, wherein the wake-up assemblies are arranged in mirror image fashion to each other when aligned with one another to cause the respective disturbances.

* * * * *